United States Patent
Dos Reis et al.

(10) Patent No.: US 11,492,096 B2
(45) Date of Patent: Nov. 8, 2022

(54) RETRACTABLE LEADING EDGE WING SLATS HAVING AUTONOMOUSLY CURVABLE AIRFLOW SHIELD FOR NOISE-ABATEMENT

(71) Applicants: EMBRAER S.A., São José dos Campos-SP (BR); USP—UNIVERSIDADE DE SÃO PAULO, São Paulo (BR)

(72) Inventors: Danillo Cafaldo Dos Reis, São José dos Campos-SP (BR); Leandro Guilherme Crenite Simões, São José dos Campos-SP (BR); Micael Gianini Valle Do Carmo, São José dos Campos-SP (BR); Fábio Santos Da Silva, São José dos Campos-SP (BR); Eduardo Lobão Capucho Coelho, São José dos Campos-SP (BR); Leandro Souza De Moura Lima, São José dos Campos-SP (BR); Paulo Anchieta Da Silva, São José dos Campos-SP (BR); Fernando Martini Catalano, São José dos Campos-SP (BR); Cecil Wagner Skaleski, São José dos Campos-SP (BR); Francisco Keller Klug, São José dos Campos-SP (BR); Marcus Felipe Hori Ochi, São José dos Campos-SP (BR)

(73) Assignees: EMBRAER S.A., São José Dos Campos—SP (BR); USP—UNIVERSIDADE DE SÃO PAULO, São Paulo (BR)

( * ) Notice: Subject to any disclaimer, the term of this patent is extended or adjusted under 35 U.S.C. 154(b) by 263 days.

(21) Appl. No.: 16/643,131

(22) PCT Filed: Sep. 1, 2017

(86) PCT No.: PCT/BR2017/000106
§ 371 (c)(1),
(2) Date: Feb. 28, 2020

(87) PCT Pub. No.: WO2019/041004
PCT Pub. Date: Mar. 7, 2019

(65) Prior Publication Data
US 2020/0346735 A1     Nov. 5, 2020

(51) Int. Cl.
*B64C 3/38*     (2006.01)
*B64C 9/22*     (2006.01)

(52) U.S. Cl.
CPC .............. *B64C 3/38* (2013.01); *B64C 9/22* (2013.01); *B64C 2220/00* (2013.01); *B64C 2230/14* (2013.01)

(58) Field of Classification Search
CPC .... B64C 3/38; B64C 3/50; B64C 9/22; B64C 9/24; B64C 2027/7288; B64C 2220/00; B64C 2230/14
See application file for complete search history.

(56) References Cited

U.S. PATENT DOCUMENTS 8,424,810 B1 *  4/2013  Shmilovich ............... B64C 9/24
                                                        244/214
8,534,610 B1    9/2013  Pitt et al.
(Continued)

OTHER PUBLICATIONS

International Search Report for PCT/BR2017/000106 dated Apr. 30, 2018, 4 pages.
(Continued)

*Primary Examiner* — John M Zaleskas
(74) *Attorney, Agent, or Firm* — Nixon & Vanderhye P.C.

(57) ABSTRACT

Noise-abatement for a leading edge wing slat is provided by a noise-abatement airflow shield integral with the lower
(Continued)

trailing edge of the slat, wherein the shield is reciprocally autonomously curveable from a substantially planar configuration when the slat is in a retracted position thereof and into a convexly curved configuration when the slat is in a deployed position thereof.

10 Claims, 2 Drawing Sheets

(56) References Cited

U.S. PATENT DOCUMENTS

| | | | | |
|---|---|---|---|---|
| 8,534,611 | B1* | 9/2013 | Pitt | B64C 3/48 244/214 |
| 8,864,083 | B1* | 10/2014 | Shmilovich | B64C 9/24 244/215 |
| 9,316,212 | B2* | 4/2016 | Browne | F03G 7/065 |
| 2004/0086699 | A1* | 5/2004 | Schneider | B32B 5/16 428/292.1 |
| 2005/0121240 | A1* | 6/2005 | Aase | F15D 1/10 180/68.1 |
| 2008/0251647 | A1* | 10/2008 | Lorkowski | B64C 9/14 244/204 |
| 2008/0272615 | A1* | 11/2008 | McKnight | F15D 1/10 296/180.5 |
| 2010/0084508 | A1* | 4/2010 | Hirai | B64C 9/24 244/210 |
| 2010/0133387 | A1* | 6/2010 | Wood | B64C 3/48 244/219 |
| 2010/0282900 | A1* | 11/2010 | Lorkowski | B64C 3/50 244/1 N |
| 2010/0288888 | A1* | 11/2010 | Coconnier | B64C 7/00 244/214 |
| 2011/0248122 | A1* | 10/2011 | Schlipf | B64C 3/50 244/214 |
| 2012/0097791 | A1* | 4/2012 | Turner | B64C 9/24 244/1 N |
| 2012/0261517 | A1* | 10/2012 | Turner | B64C 9/18 244/214 |
| 2014/0026554 | A1* | 1/2014 | Browne | F03G 7/065 60/527 |
| 2014/0027538 | A1 | 1/2014 | Webster | |
| 2014/0138487 | A1* | 5/2014 | Hodkisson | B64C 9/24 244/129.2 |
| 2014/0166818 | A1* | 6/2014 | Tanaka | B64C 3/187 244/214 |
| 2014/0209734 | A1* | 7/2014 | Okabe | B64C 9/34 244/99.3 |
| 2014/0312175 | A1* | 10/2014 | Sakurai | B64C 9/24 244/99.2 |
| 2015/0102161 | A1* | 4/2015 | Pitt | B64C 9/22 244/1 N |
| 2016/0137284 | A1* | 5/2016 | Turner | B64C 9/22 244/1 N |
| 2016/0297513 | A1* | 10/2016 | Sakurai | B64C 9/22 |
| 2017/0152018 | A1* | 6/2017 | Kawai | B64C 3/28 |
| 2018/0258920 | A1* | 9/2018 | Kessler | H05B 1/0294 |
| 2019/0002084 | A1* | 1/2019 | Kawai | B64C 9/24 |
| 2019/0112029 | A1* | 4/2019 | Turner | B64C 3/50 |
| 2021/0070422 | A1* | 3/2021 | Dos Reis | B64C 3/28 |

OTHER PUBLICATIONS

Written Opinion of the ISA for PCT/BR2017/000106 dated Apr. 30, 2018, 6 pages.

* cited by examiner

RETRACTABLE LEADING EDGE WING SLATS HAVING AUTONOMOUSLY CURVABLE AIRFLOW SHIELD FOR NOISE-ABATEMENT

This application is the U.S. national phase of International Application No. PCT/BR2017/000106 filed Sep. 1, 2017 which designated the U.S., the entire contents of each of which are hereby incorporated by reference.

FIELD

The embodiments disclosed herein relate generally to systems to provide noise abatement for retractable leading edge wing slats of an aircraft wing assembly when the slats are deployed. In specific embodiments, the retractable slats include an autonomously curveable airflow shield provided at a terminal end region of the lower trailing edge of the slat.

BACKGROUND

The noise emitted from an aircraft during take-offs and landings is a significant issue contributing to urban noise pollution in large cities. The aerospace community has been committed since the 1960's to reduce noise levels of commercial aircraft. The maximum noise allowed for an aircraft is regulated by the type certification for the aircraft, for example, the regulations promulgated by PART36 of the Federal Aviation Administration (FAA). These regulatory requirements have imposed more restrictive levels of noise in more recent years.

The progressive introduction of larger and more energy efficient turbofan engines has significantly reduced aircraft engine noise. The non-propulsive part of the airplane (airframe) has however become a major source of noise, mainly during approach and landing phases of flight. One of the most relevant airframe noise source in current aircraft designs are the high-lift devices associated with the aircraft's wings, especially the leading edge devices, such as retractable leading edge wing slats.

There are some prior proposals in the art which are focused on reducing noise generated by leading edge slats, such as those provided by U.S. Pat. Nos. 6,454,219, 8,424,810 and 9,242,720, the entire contents of each being expressly incorporated hereinto by reference. While the proposals in the prior art may be satisfactory for their stated purpose, continual improvements to provide enhanced noise abatement characteristics to retractable leading edge wing slats are still sought.

It is towards providing such improvement to noise abatement characteristics for retractable leading edge wing slats that the embodiments disclosed herein are directed.

SUMMARY

In general, noise-abatement for a leading edge wing slat is provided according to embodiments disclosed herein by a noise-abatement airflow shield integral with the lower trailing edge of the slat, wherein the shield is autonomously curveable to assume a convexly curved configuration in response to the slat moving from a retracted position to a deployed position thereof. The shield may include guide elements along the slat span which are fixed to and extend outwardly from a terminal end of the shield.

In general, the lower trailing edge of conventional retractable slats has an integral airflow shield that is mainly responsible for sealing the wing for cruise. These current shields follow the cruise wing profile, being substantially in a planar state, allowing the slats to be retractable. According to some embodiments of the herein claimed invention, however, the shield is capable of autonomous curvature. Such autonomous curvature, may, for example, be provided by a sheet of shape-memory material embedded in a layer of elastomeric material to thereby induce convex curvature of the shield in response to an external stimuli (e.g. electrical current) when the slat is moved into a deployed condition thereof, and which allows the shield to assume its normal (e.g., unstimulated) planar state when the slat is moved to the retracted condition thereof thereby allowing the shield to be sealed for cruise flight operations. Alternatively or additionally, the shield may include a band of shape-memory material fixed to an inner surface of the shield to thereby induce convex curvature of the shield in response to an external stimuli (e.g. electrical current) when the slat is moved into the deployed condition thereof, and which allows the shield to assume its normal (e.g., unstimulated) planar state when the slat is moved to the retracted condition thereof thereby allowing the shield to be sealed for cruise flight operations.

Alternatively (or additionally), the shield may include a certain combination of elastic materials (steel, fiber glass and/or elastomeric material) having a spring-like biasing property which thereby would not necessarily require external stimuli to induce curvature. Such a combination of materials would thereby be maintained in a substantially convexly curved configuration when the slat is moved into the deployed condition. In such an embodiment, it is preferred that one or more fixed guide elements be provided at the distal edge of the slat to thereby encourage the shield to return to a planar state when the slat is retracted so that the slat once again assumes a substantially planar configuration. As such, the slat is both retractable and sealed for cruise flight operations.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
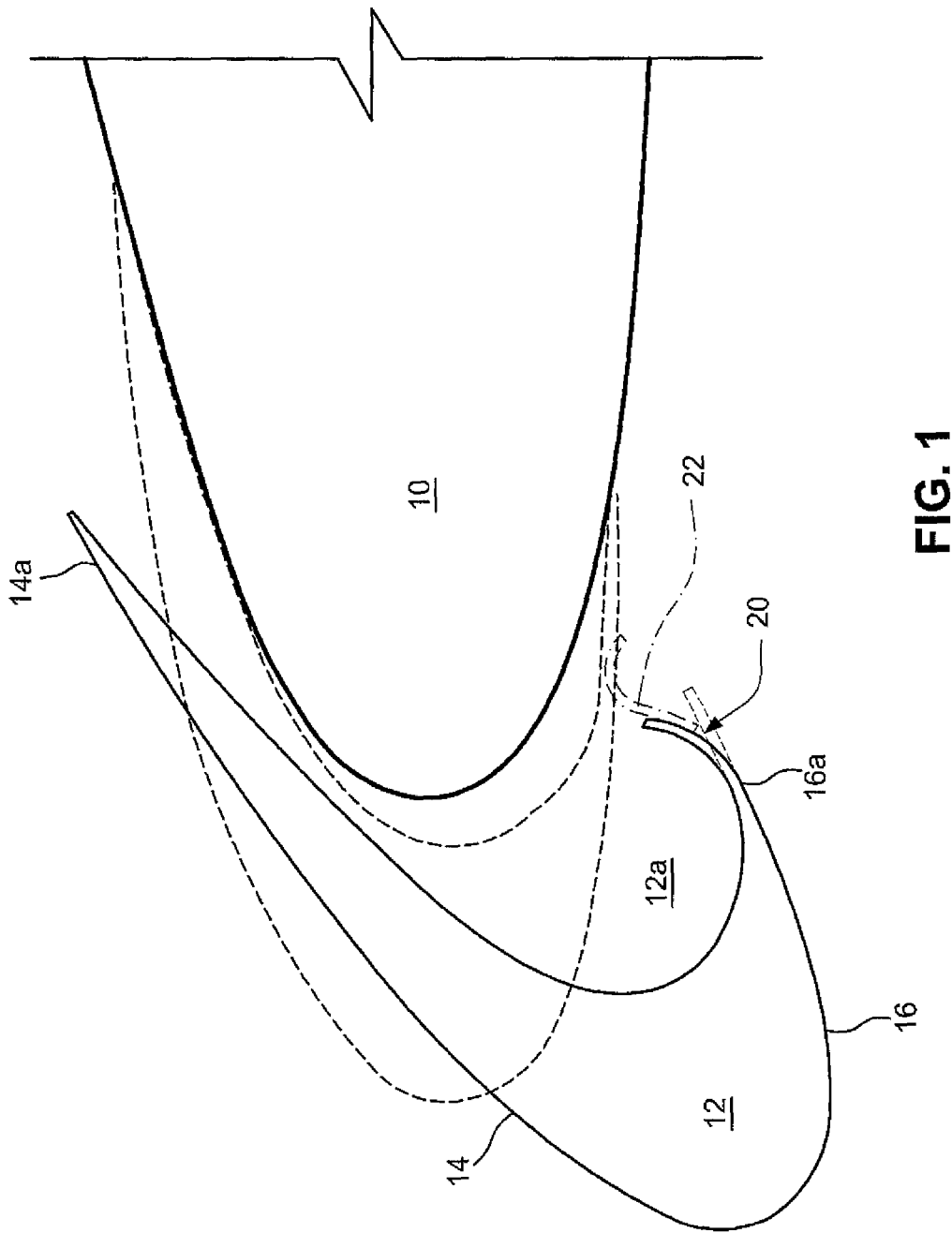
FIG. 1 is a schematic side end profile view of an aircraft wing and a forward edge wing slat which embodies the noise-abatement shield associated with a lower trailing edge thereof.

FIG. 1 is an enlarged schematic side end profile view of an aircraft wing 10 and a forward edge slat 12. The edge slat 12 includes upper and lower slat surfaces 14, 16 having trailing edges 14a, 16a, respectively. The terminal end region of the lower trailing edge 16a will integrally include a noise-abatement shield 20 in accordance with an embodiment of the present invention.

As depicted, the shield 20 is caused to assume a generally convexly curved shape when the edge slat 12 is moved from its retracted condition (shown by dashed lines in FIG. 1) and into the deployed condition (shown by solid lines in FIG. 1). Conversely, when the edge slat 12 is moved from its deployed condition (shown by solid lines in FIG. 1) into its retracted position (shown by dashed lines in FIG. 1), the convexly curved shape of the shield 20 will once again assume a substantially planar state. During the deployment movement of edge slat 12, the shield 20 will curve autonomously from a substantially planar state and into a convexly curved state so as to minimize vertical recirculating air flow within the cove region 12a of the edge slat 12 when deployed thereby providing noise abatement. As noted above, however, during the retraction movement of the slat 12, the shield 20 will curve autonomously from convexly curved state into a substantially planar state so as to allow the perfect retraction of the slat 12 and the sealing of the wing 10 for cruise flight operations.

A concavely curved guide element 22 may optionally be fixed to and extend outwardly from the terminal end of the shield 20. If present, the concavely curved guide element 22 will assist in the straightening of the shield 20 into a substantially planar state when the edge slat 12 is moved into its retracted position. The presence of the guide element 22 may, for example, be present in those embodiments whereby the shield 20 is formed of passive shape-memory materials that will autonomously curve the shield when the slat 12 is moved into the deployed condition thereof. Thus, as the edge slat 12 retracts, the guide element 22 will come into contact with the lower surface of the fixed wing 10 thereby assisting the straightening of the shield 20 into a substantially planar state so as to provide a gap seal during cruise flight configurations.

Figure 2:
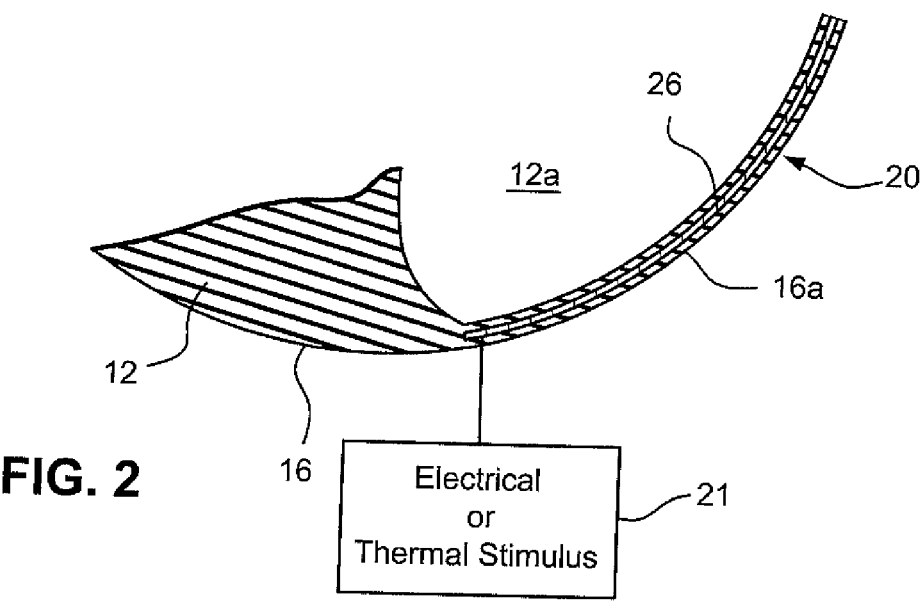
FIG. 2 is an enlarged schematic cross-sectional view of the lower trailing edge of the noise-abatement shield depicted in FIG. 1.

As is depicted in FIG. 2, the autonomous curvature of the shield 20 may be induced by providing a sheet 26 formed of a shape memory material, such as a shape memory metal alloy or composite material which is embedded in an elastomeric material forming at least the lower trailing edge 16a of the lower surface 16 associated with the edge slat 12. The shape memory material is preferably responsive to an electrical or thermal stimulus shown schematically in FIGS. 2 and 3 by box 21 that changes the temperature of the shape memory material thereby causing the material to curve. The stimulus 21 may, for example, operatively be associated with the on-board flap deployment/retraction system. Thus, upon actuation of the flap deployment system, the stimulus 21 could responsively be applied to the shape memory material thereby causing the shield 20 to convexly curve when the slat 12 is moved into the deployed condition. Conversely, the stimulus 21 could be disabled upon actuation of the slat retraction system thereby causing the shape memory material of the shield to return to a substantially planar state.

Virtually any shape memory material may be employed in the practice of this invention, such as those disclosed in U.S. Pat. No. 9,316,212 (the entire contents of which are expressly incorporated hereinto by reference). Preferred shape memory materials include shape memory alloys (SMA) which have the ability to return to a previously defined (normal) shape when subjected to a suitable thermal stimulus. Such shape memory materials are capable of undergoing phase transitions in which shape is altered as a function of temperature. Other shape memory materials may also be employed, such as shape memory polymers and ceramics.

As an alternative embodiment, the autonomous curvature of the shield 20 may be achieved by a combination of elastics materials (such as steel and fiber glass) in a way to create a spring-biasing property and to provide the sheet 26 an intrinsically (normal) convexly curved state. The sheet 26 may thus be embedded in an elastomeric material forming at least the lower trailing edge 16a of the lower surface 16 associated with the edge slat 12. The normal convexly curved state of the shield 20 provided with the lower trailing edge 16a will thereby return to the substantially planar state against the spring-bias force of the materials when in contact with the leading edge of the wing 10. According to this embodiment, it is typically preferred to include a number of guide elements 22 (see FIG. 1) to assist in the straightening of the shield 20 to a substantially planar state when the slat 12 is retracted.

Figure 3:
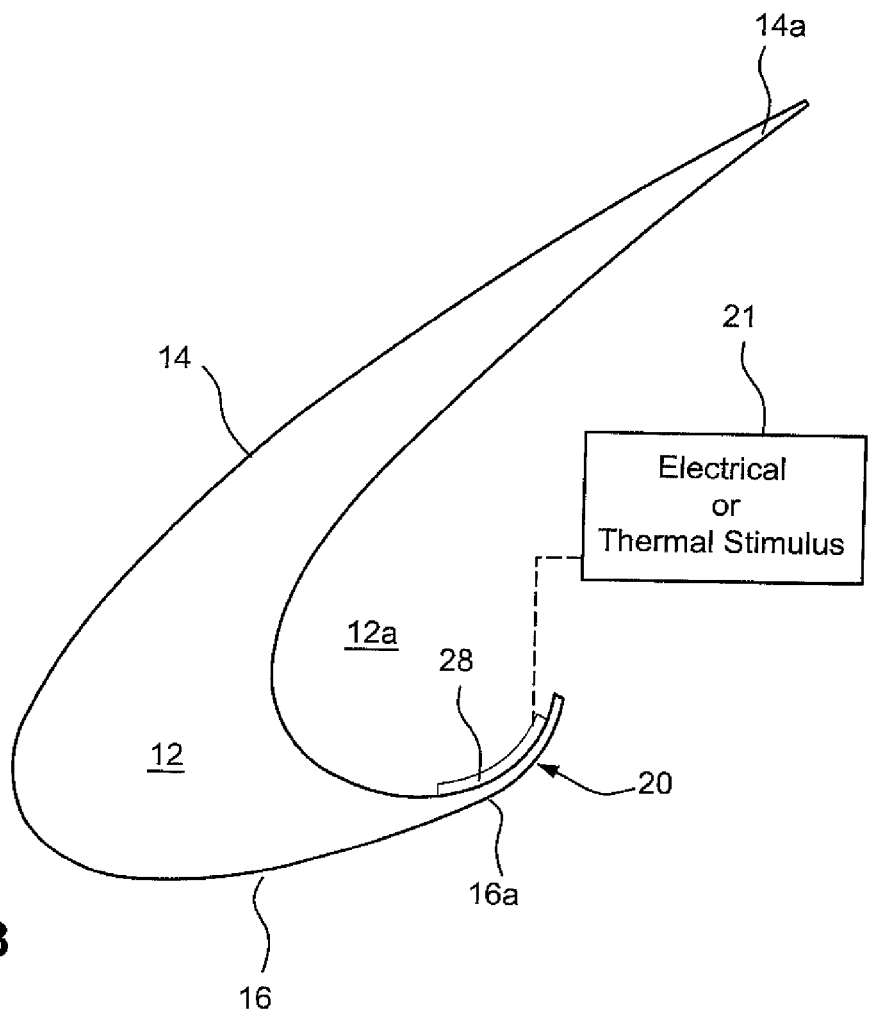
FIG. 3 is an alternative embodiment of a noise-abatement shield associated with the lower trailing edge of the wing slat.

Alternatively or additionally as depicted in FIG. 3, the autonomous curvature of the shield 20 may be induced by a tape-like band section 28 of a shape memory material fixed to an interior surface region of the shield 20. The band section 28 having shape memory characteristics will therefore cause shield 20 to be convexly curved in response to a stimulus 21 when the slat 12 is moved into its deployed condition in a manner similar to that described previously with respect to FIG. 2. When the slat 12 is returned to the retracted state, therefore, the stimulus 21 may be removed from the band section 28 thereby allowing the shield 20 to return to its substantially planar state.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. An aircraft wing comprising:
    a wing leading edge, and
    a leading edge wing slat system which comprises:
    (i) a leading edge wing slat operatively positioned forwardly of the wing leading edge so as to be movable between retracted and deployed positions relative to the wing leading edge, the leading edge wing slat having upper and lower surfaces with upper and lower trailing edges, respectively,
    (ii) a noise-abatement airflow shield comprising a shape memory alloy (SMA) material integral with and extending rearwardly from the lower trailing edge of the leading edge wing slat, wherein the SMA material of the noise-abatement airflow shield is responsive to electrical or thermal stimulus so as to be reciprocally curveable between a straightened configuration when the leading edge wing slat is in the retracted position thereof and into a convexly curved configuration when the leading edge wing slat is in the deployed position thereof, and
    (iii) a source providing the electrical or thermal stimulus connected operatively to the SMA material of the noise-abatement airflow shield so as to cause the noise-abatement airflow shield to be convexly curved in response to movement of the leading edge wing slat between the retracted and deployed positions thereof, respectively.

2. The leading edge wing slat according to claim 1, wherein the noise-abatement airflow shield comprises a sheet of the SMA material.

3. The leading edge wing slat according to claim 2, wherein the sheet of SMA material is embedded in a layer of elastomeric material.

4. The leading edge wing slat according to claim 1, wherein the noise-abatement airflow shield comprises a band of the SMA material fixed to an inner surface of the noise-abatement airflow shield.

5. An aircraft which comprises the aircraft wing according to claim 1.

6. An aircraft wing comprising:
a wing leading edge, and
a leading edge wing slat system which comprises:
(i) a leading edge wing slat operatively positioned forwardly of the wing leading edge so as to be movable between retracted and deployed positions relative to the wing leading edge, wherein the leading edge wing slat includes upper and lower surfaces with upper and lower trailing edges, respectively, and
(ii) a noise-abatement airflow shield integral with and extending rearwardly from the lower trailing edge of the leading edge wing slat, wherein
(iii) the noise-abatement airflow shield includes a free terminal end that is capable of contacting the wing leading edge in response to the leading edge wing slat being moved from the deployed position and into the retracted position thereof, and wherein
(iv) the noise-abatement airflow shield is formed of a shape-memory material which provides a spring-biasing property to the noise-abatement airflow shield so that the noise-abatement airflow shield has a normal convexly curved condition when the leading edge wing slat is in the deployed position thereof, the noise-abatement airflow shield assuming a straightened configuration when the free terminal end thereof contacts the wing leading edge in response to the leading edge wing slat being moved into the retracted position thereof.

7. The aircraft wing according to claim 6, wherein the shape-memory material comprises a combination of steel and fiber glass to provide the spring-biasing property.

8. The aircraft wing according to claim 7, wherein the shape-memory material comprises a sheet of the shape memory material embedded in an elastomeric material.

9. The aircraft wing according to claim 6, wherein the noise-abatement airflow shield includes guide elements operatively connected to the free terminal end thereof so as to assist in straightening of the noise-abatement airflow shield to the straightened configuration when the leading edge wing slat is moved from the deployed position thereof into the retracted position thereof.

10. An aircraft which comprises the aircraft wing according to claim 6.

* * * * *